United States Patent
Zhang et al.

(10) Patent No.: US 11,583,768 B2
(45) Date of Patent: Feb. 21, 2023

(54) SYSTEMS AND METHODS FOR SECURE CONCURRENT STREAMING OF APPLICATIONS

(71) Applicant: Meta Platforms, Inc., Menlo Park, CA (US)

(72) Inventors: Qunshu Zhang, Sammamish, WA (US); Carlos Lopez Menendez, Madrid (ES); Francisco Javier Merino Guardiola, Madrid (ES)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/507,303

(22) Filed: Oct. 21, 2021

(65) Prior Publication Data
US 2022/0126199 A1    Apr. 28, 2022

Related U.S. Application Data

(60) Provisional application No. 63/194,821, filed on May 28, 2021, provisional application No. 63/105,320, filed on Oct. 25, 2020.

(51) Int. Cl.
*A63F 13/355* (2014.01)
*A63F 13/48* (2014.01)
(Continued)

(52) U.S. Cl.
CPC .......... *A63F 13/355* (2014.09); *A63F 13/352* (2014.09); *A63F 13/48* (2014.09);
(Continued)

(58) Field of Classification Search
None
See application file for complete search history.

(56) References Cited

U.S. PATENT DOCUMENTS 6,763,518 B2   7/2004   Hart et al.
8,410,994 B1   4/2013   Testa et al.
(Continued)

FOREIGN PATENT DOCUMENTS

WO   2017053539 A1   3/2017
WO   2019147974 A2   8/2019

OTHER PUBLICATIONS

Abdullah M., at al., "Predictive Autoscaling of Microservices Hosted in Fog Microdata Center," IEEE Systems Journal, Jun. 10, 2020, vol. 15, No. 1, pp. 1275-1286.
(Continued)

*Primary Examiner* — Reginald A Renwick
(74) *Attorney, Agent, or Firm* — Greenberg Traurig, LLP

(57) ABSTRACT

The disclosed computer-implemented method may include (1) provisioning a cloud gaming environment with a plurality of containers that share a single operating system instance, (2) allocating each container within the plurality of containers to a corresponding user, (3) executing, concurrently, within each container within the plurality of containers a corresponding video game instance and (4) streaming, concurrently, from the cloud gaming environment, a video game instance from each container within the plurality of containers to a corresponding client system. Various other methods, systems, and computer-readable media are also disclosed.

20 Claims, 12 Drawing Sheets

(51) Int. Cl.

| | |
|---|---|
| *A63F 13/79* | (2014.01) |
| *H04L 67/10* | (2022.01) |
| *H04L 67/306* | (2022.01) |
| *A63F 13/352* | (2014.01) |
| *A63F 13/49* | (2014.01) |
| *G06F 9/455* | (2018.01) |
| *H04L 67/141* | (2022.01) |
| *H04L 67/145* | (2022.01) |
| *H04L 65/65* | (2022.01) |
| *H04L 65/612* | (2022.01) |
| *H04L 67/01* | (2022.01) |
| *H04L 67/131* | (2022.01) |
| *H04L 67/568* | (2022.01) |

(52) U.S. Cl.
CPC .............. *A63F 13/49* (2014.09); *A63F 13/79* (2014.09); *G06F 9/45558* (2013.01); *H04L 65/612* (2022.05); *H04L 65/65* (2022.05); *H04L 67/01* (2022.05); *H04L 67/10* (2013.01); *H04L 67/131* (2022.05); *H04L 67/141* (2013.01); *H04L 67/145* (2013.01); *H04L 67/306* (2013.01); *H04L 67/568* (2022.05); *A63F 2300/538* (2013.01); *A63F 2300/5546* (2013.01); *A63F 2300/636* (2013.01); *G06F 2009/45587* (2013.01); *G06F 2009/45595* (2013.01)

(56) References Cited

U.S. PATENT DOCUMENTS

| | | | |
|---|---|---|---|
| 9,704,270 | B1 | 7/2017 | Main et al. |
| 10,491,666 | B2 | 11/2019 | Colenbrander |
| 2007/0174429 | A1 | 7/2007 | Mazzaferri et al. |
| 2012/0005316 | A1 | 1/2012 | Perry et al. |
| 2014/0019963 | A1 | 1/2014 | Deng et al. |
| 2014/0274408 | A1* | 9/2014 | Dave ................ H04L 67/1097 463/42 |
| 2014/0342819 | A1 | 11/2014 | Bruno, Jr. et al. |
| 2015/0375113 | A1 | 12/2015 | Justice et al. |
| 2016/0256784 | A1 | 9/2016 | Schultz et al. |
| 2017/0032050 | A1 | 2/2017 | Kol et al. |
| 2017/0185437 | A1 | 6/2017 | Thomas et al. |
| 2017/0279895 | A1 | 9/2017 | Ehara et al. |
| 2018/0189923 | A1 | 7/2018 | Zhong et al. |
| 2018/0270124 | A1 | 9/2018 | Chugtu et al. |
| 2018/0361235 | A1 | 12/2018 | Hunter |
| 2019/0116160 | A1 | 4/2019 | Bhat et al. |
| 2019/0308099 | A1 | 10/2019 | Lalonde et al. |
| 2019/0317780 | A1 | 10/2019 | Thomas et al. |
| 2020/0099753 | A1 | 3/2020 | Fleck et al. |
| 2020/0167175 | A1 | 5/2020 | Tsirkin |
| 2020/0171382 | A1 | 6/2020 | Agoston |
| 2020/0204463 | A1 | 6/2020 | Guan et al. |
| 2020/0249819 | A1* | 8/2020 | Berquam ................ G06F 3/011 |
| 2020/0306632 | A1 | 10/2020 | Kolen et al. |
| 2021/0176288 | A1 | 6/2021 | Ahuja et al. |
| 2021/0208918 | A1 | 7/2021 | Singleton, IV et al. |
| 2021/0377623 | A1 | 12/2021 | Larson et al. |

OTHER PUBLICATIONS

Berdajs J., et al., "Extending Applications Using an Advanced Approach to DLL Injection and API Hooking", Software-Practice and Experience, Wiley &Sons, Bognor Regis, GB, Jun. 1, 2010, vol. 40 (7), pp. 567-584, Retrieved on Apr. 20, 2010, XP007917822, ISSN: 0038-0644, DOI: 10.1002/SPE.973.

Chen H., et al., "T-Gaming: A Cost-Efficient Cloud Gaming System at Scale", IEEE Transactions on Parallel and Distributed Systems, IEEE, USA, Dec. 1, 2019, vol. 30 (12), pp. 2849-2865, Retrieved on Nov. 11, 2019, XP011755425, ISSN: 1045-9219, DOI: 10.1109/TPDS.2019.2922205.

Imdoukh M., et al., "Machine Learning—Based Auto—Scaling for Containerized Applications," Neural Computing and Applications, , Oct. 8, 2019, vol. 32, No. 13, pp. 9745-9760.

International Search Report and Written Opinion for International Application No. PCT/US2021/056369, dated Feb. 11, 2022, 7 pages.

International Search Report and Written Opinion for International Application No. PCT/US2021/056370, dated Feb. 10, 2022, 10 pages.

International Search Report and Written Opinion for International Application No. PCT/US2021/056371, dated Feb. 9, 2022, 10 pages.

International Search Report and Written Opinion for International Application No. PCT/US2021/056372, dated Feb. 9, 2022, 8 pages.

International Search Report and Written Opinion for International Application No. PCT/US2021/056373, dated Feb. 8, 2022, 8 pages.

International Search Report and Written Opinion for International Application No. PCT/US2021/056387, dated Feb. 11, 2022, 8 Pages.

Kamarainen T., et al., "Virtual Machines vs. Containers in Cloud Gaming Systems", 2015 International Workshop on Network and Systems Support for Games (Netgames), IEEE, Dec. 3, 2015, Retrieved on Jan. 13, 2016, pp. 1-6, XP032850084, DOI: 10.1109/NETGAMES.2015.7382987.

Nae V., et al., "Dynamic Resource Provisioning in Massively Multiplayer Online Games," IEEE Transactions on Parallel and Distributed Systems, Mar. 1, 2011, vol. 22, No. 3, pp. 380-395.

Zhang X., et al., "Improving Cloud Gaming Experience through Mobile Edge Computing," IEEE Wireless Communications, Coordinated Science Laboratory, vol. 26, No. 4, Aug. 1, 2019, 6 pages.

* cited by examiner

SYSTEMS AND METHODS FOR SECURE CONCURRENT STREAMING OF APPLICATIONS

CROSS REFERENCE TO RELATED APPLICATIONS

This application claims the benefit of U.S. Provisional Application No. 63/105,320, filed 25 Oct. 2020, and U.S. Provisional Application No. 63/194,821, filed 28 May 2021, the disclosures of each of which are incorporated, in their entirety, by this reference. Co-pending U.S. application Ser. No. 17/506,640, filed 20 Oct. 2021, is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
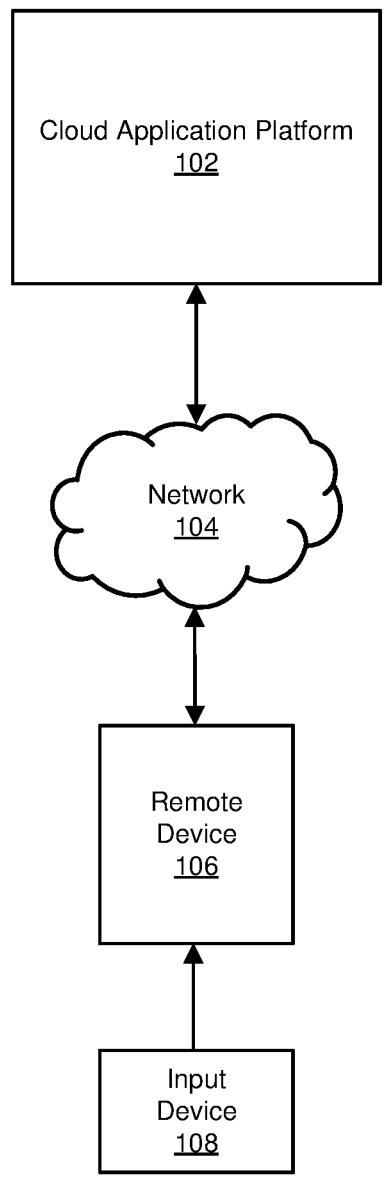
FIG. 1 is an illustration of an example system for streaming applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Hosting game instances on a cloud gaming host platform may be resource intensive. At the same time, multiple game instances running on a shared platform may raise user security and privacy issues. The present disclosure is generally directed to virtualizing each game instance's runtime environment such that system resources are shared (allowing their usage to be maximized) while game sessions are isolated from each other. Thus, a sandbox for each game instance may lower each game's effective system permissions and may present each game with a constrained view of system resources. In some cases, games may not natively support sandboxing or running multiple instances in parallel. Thus, systems described herein may configure the sandbox to address compatibility issues (without, e.g., requiring modification to the games themselves). In addition, systems described herein may detect and/or address various compatibility and security issues. A component of systems described herein may configure the operating system to create a low-privilege environment. A runtime component may intercept specific system calls and virtualize them to enable running within the containerized environment. In this manner, per-user isolation may be provided (e.g., in a MICROSOFT WINDOWS context) for running multiple games with multiple users per emulator.

By executing multiple game instances with a single shared virtual machine (with, e.g., a single shared operating system), the systems described herein may improve the efficient use of computing resources (by, e.g., fully using the resources provided by the single operating system rather than requiring the execution of separate operating systems for each video game instance). By containerizing each game instance within the shared virtual machine and handling system calls via a sandbox, these systems may effectively isolate users from each other, preventing privacy and security issues, while also seamlessly adapting the games to a cloud environment and preventing collisions that may otherwise result from attempts by multiple game instances to use unique resources.

Accordingly, the systems described herein may improve the functioning of a computer and/or a computing environment by more efficiently allocating computing resources of the computer. In addition, the systems described herein may improve the functioning of a computer by improving the privacy, security, and/or compatibility provided by the computer. Furthermore, the systems described herein may improve the fields of application streaming (including, e.g., streaming video games from the cloud) by improving the security, privacy, compatibility, and functionality of streaming video games.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 3:
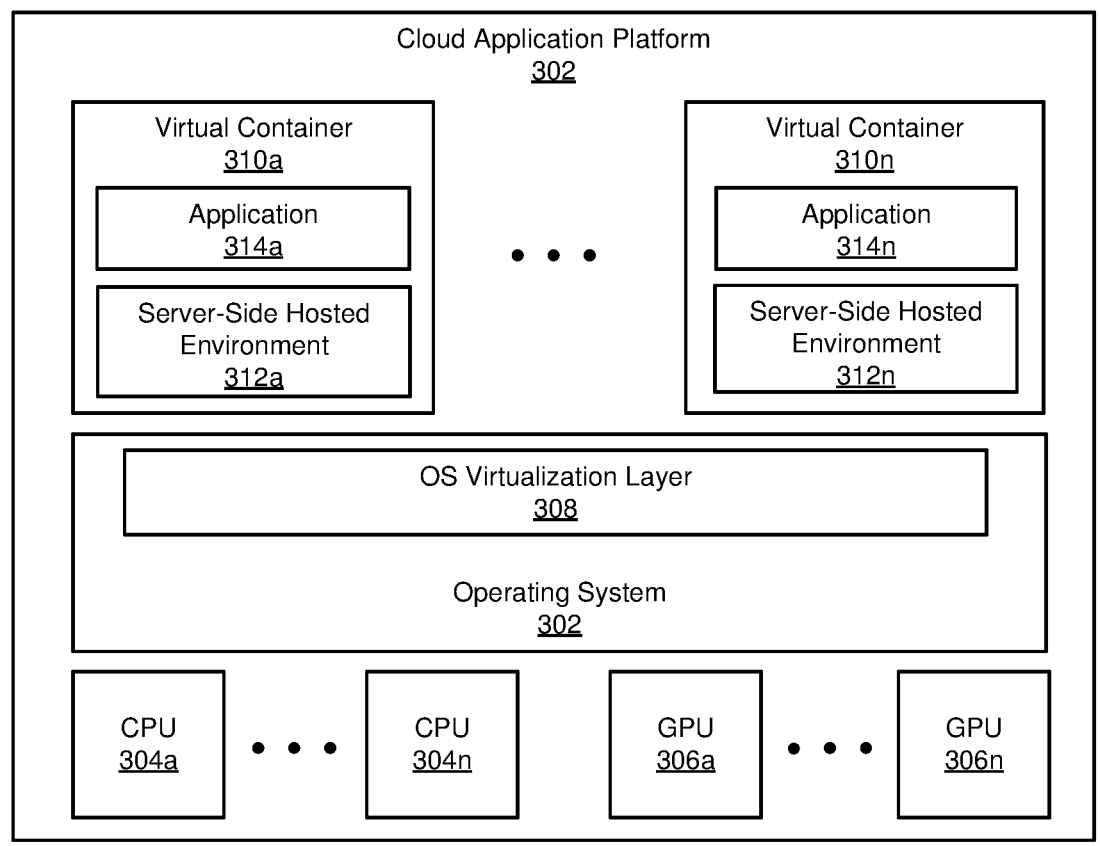
FIG. 3 is an additional illustration of various aspects of the system for streaming applications.
Figure 4:
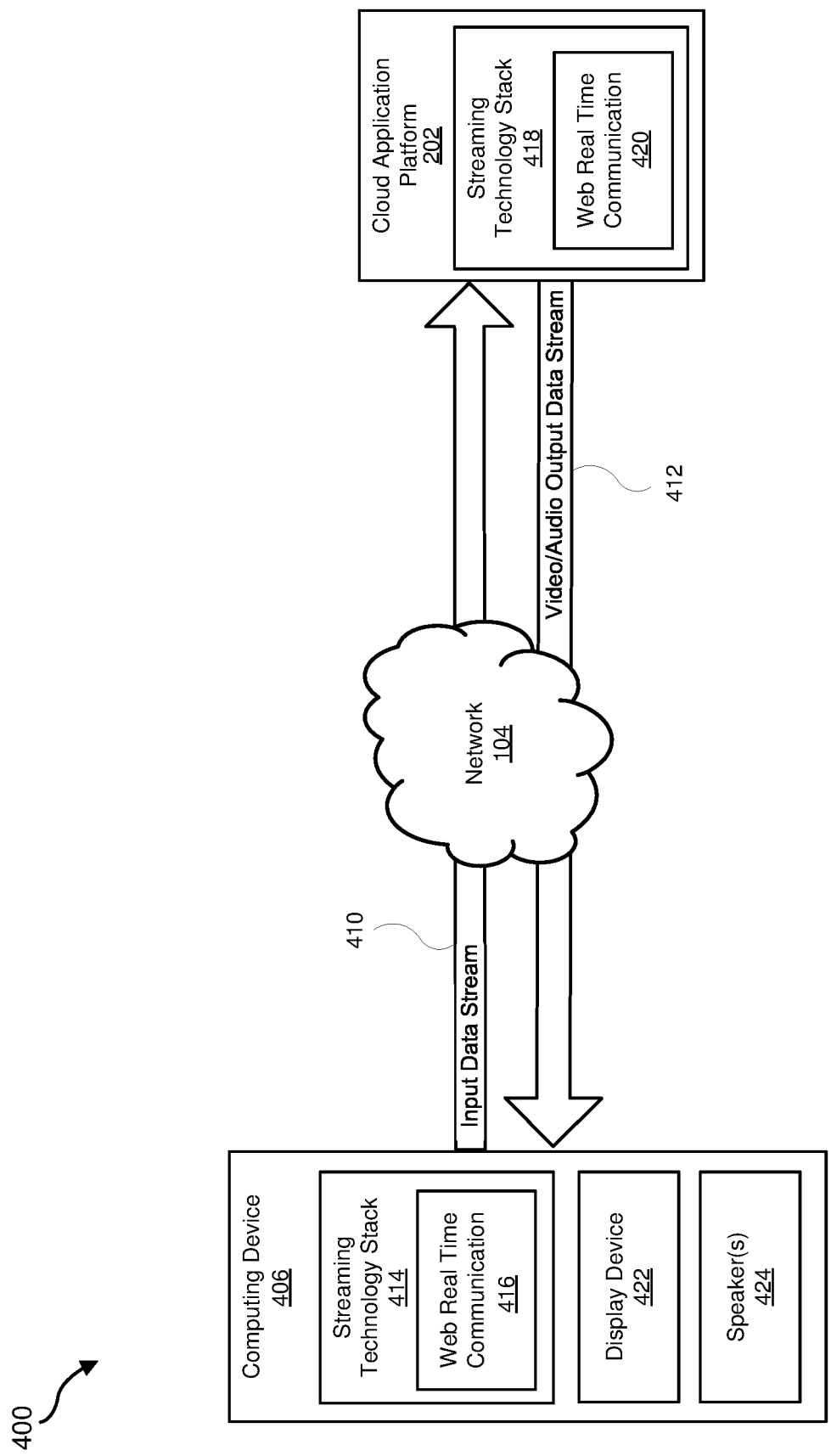
FIG. 4 is a further illustration of various aspects of the system for streaming applications.
Figure 5:
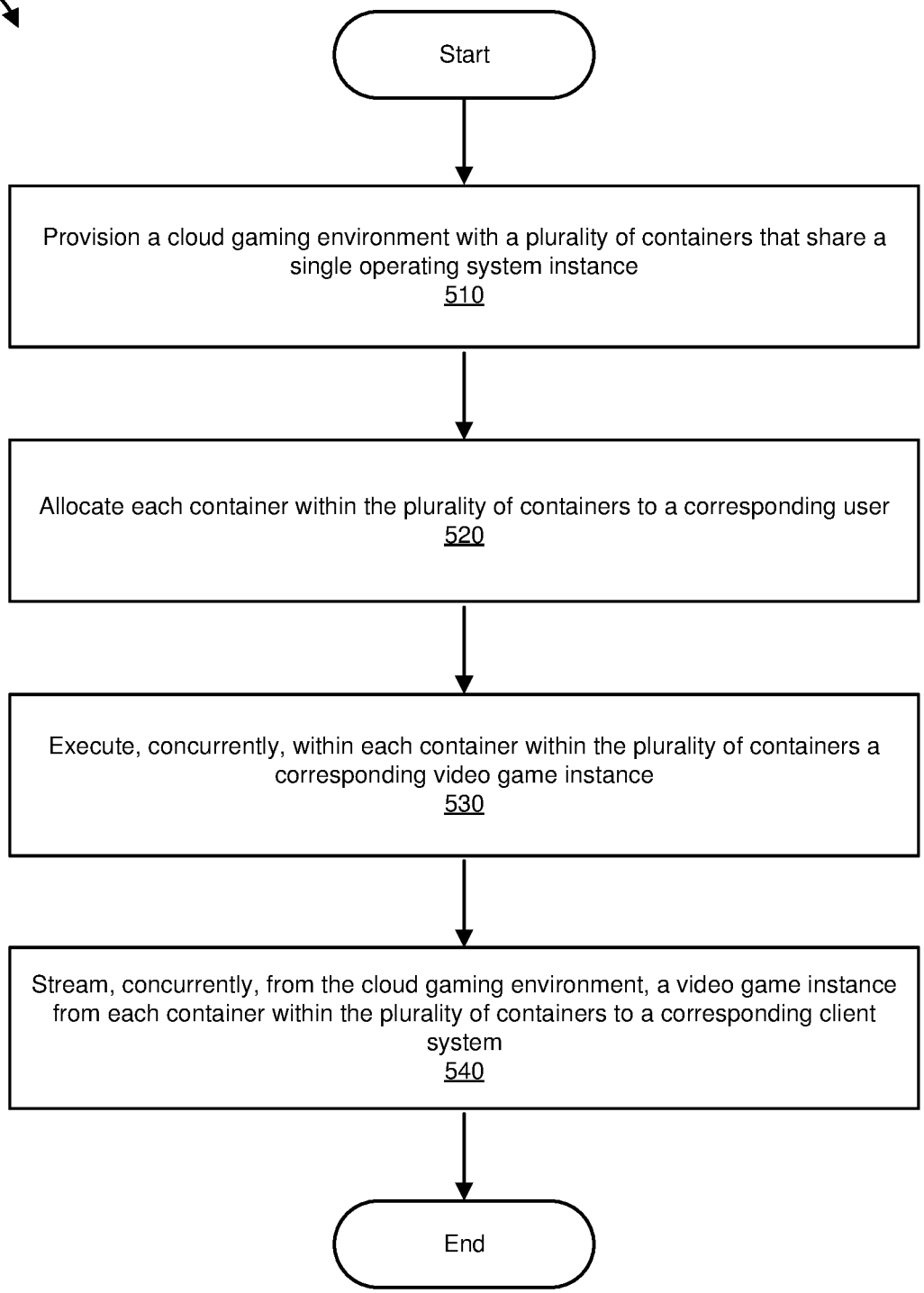
FIG. 5 is a flow diagram of an example method for secure concurrent streaming of applications.
Figure 6:
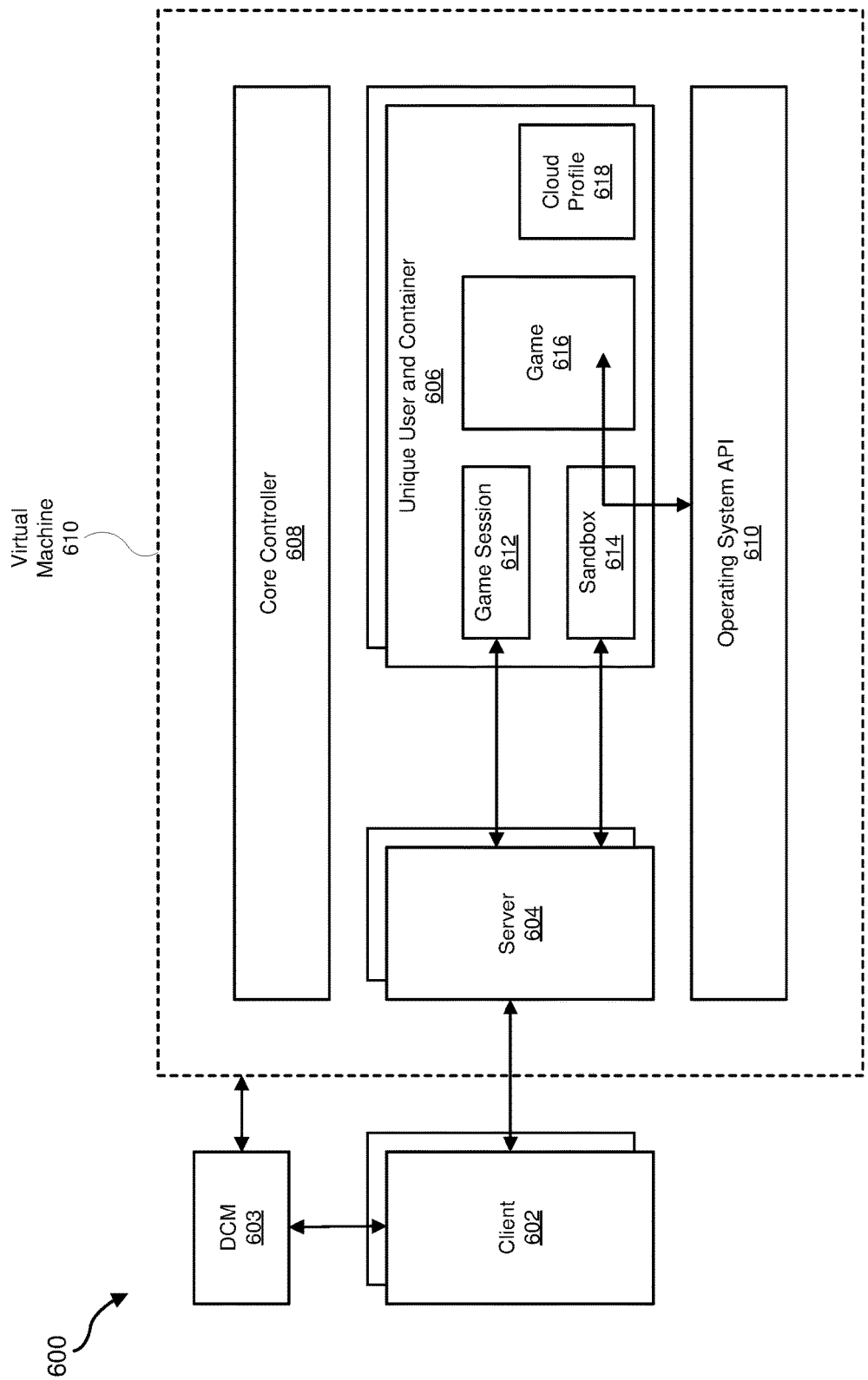
FIG. 6 is an illustration of an example system for secure concurrent streaming of applications.
Figure 7:
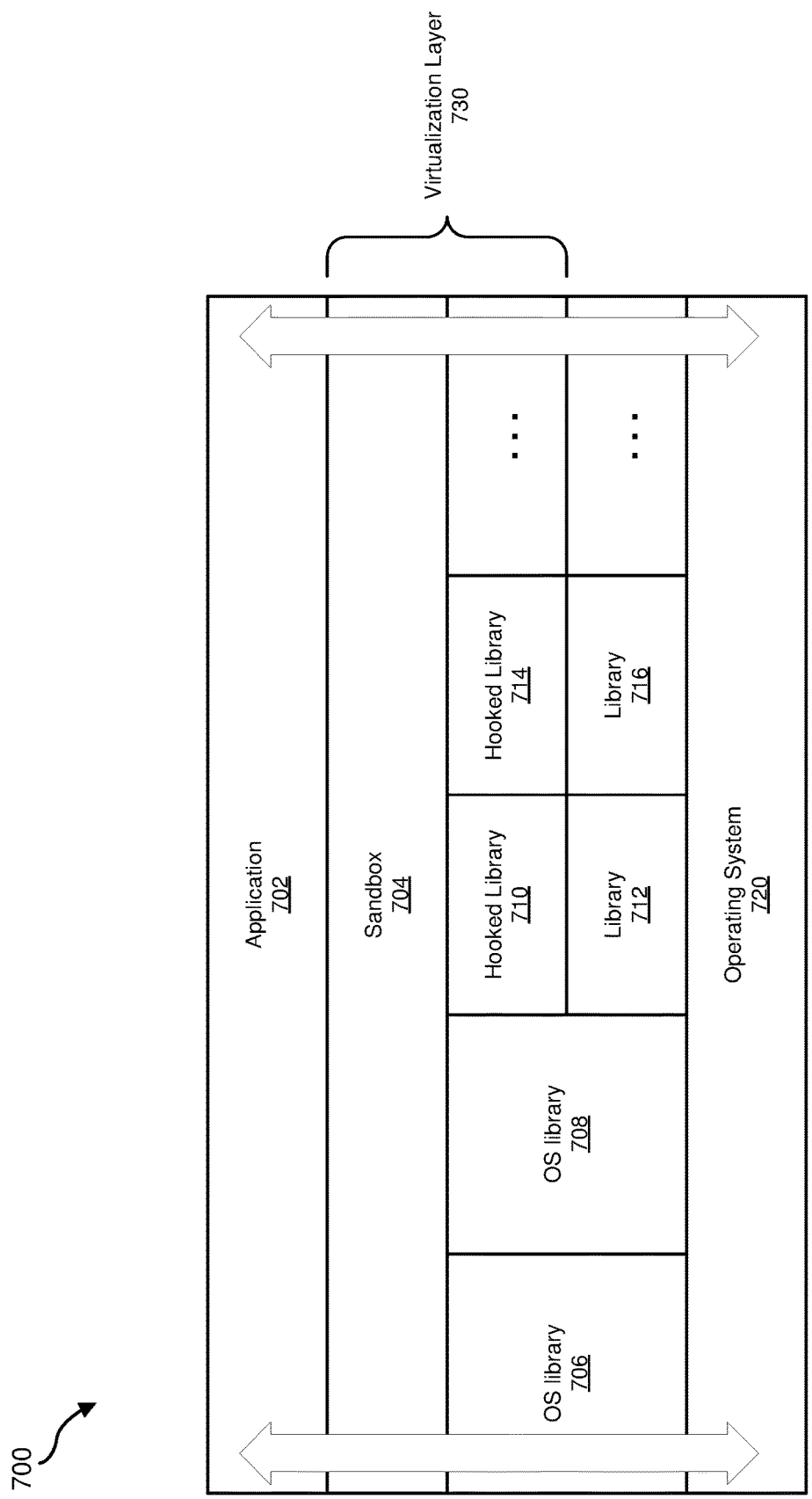
FIG. 7 is an illustration of an example virtualization layer used for secure concurrent streaming of applications.
Figure 8:
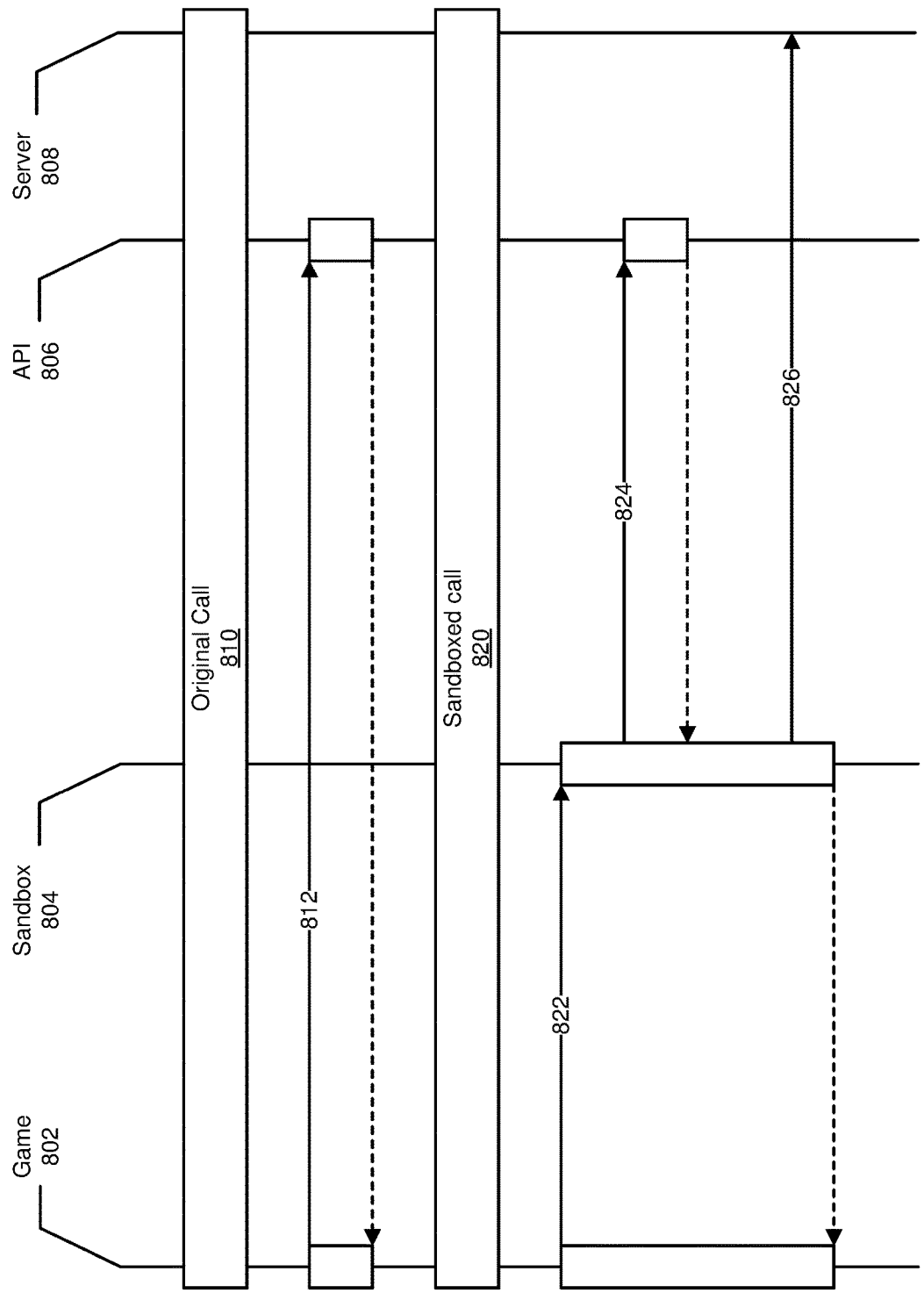
FIG. 8 is an illustration of an example process for secure concurrent streaming of applications.
Figure 9:
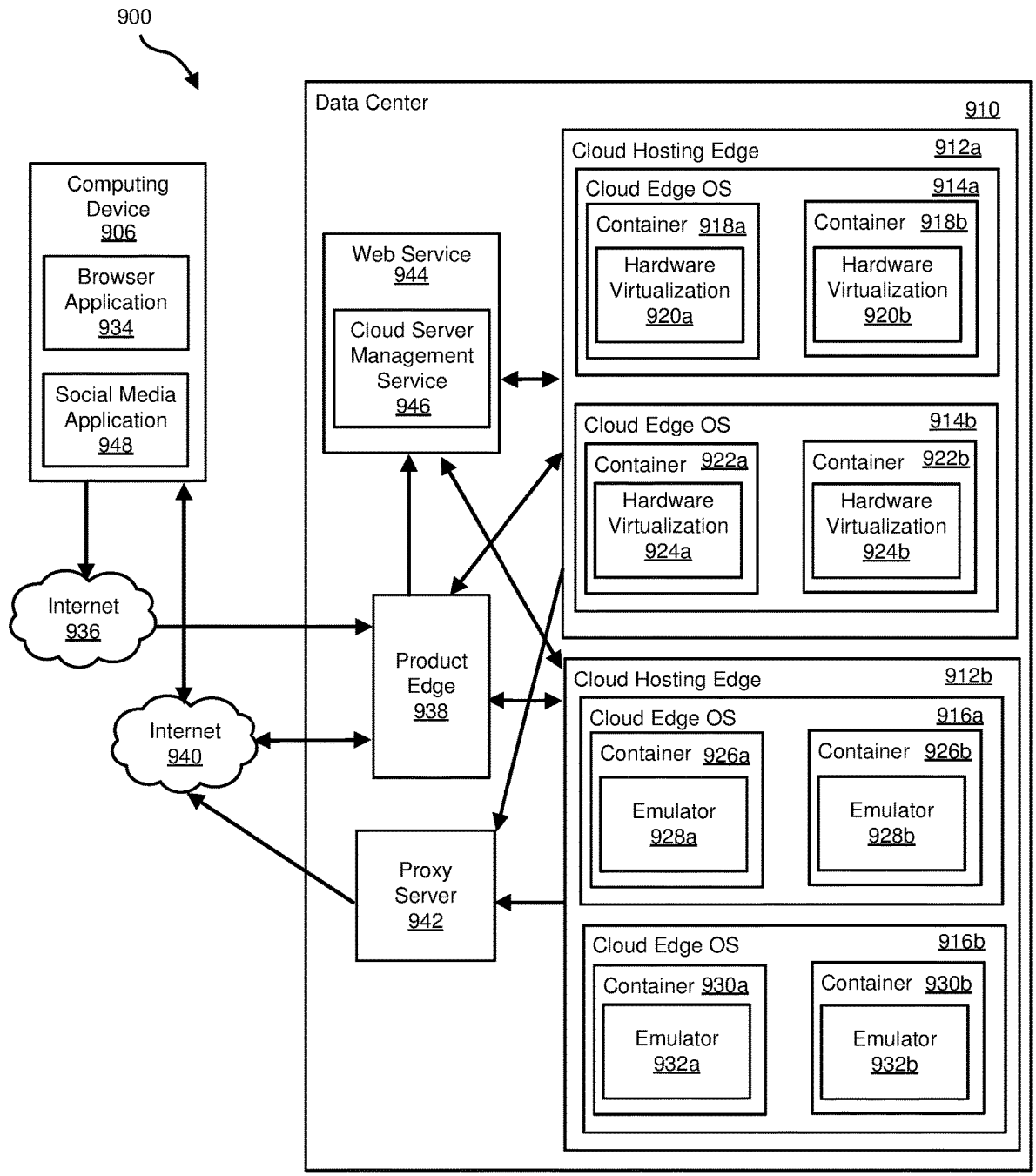
FIG. 9 is an illustration of an example environment for secure concurrent streaming of applications.
Figure 10:
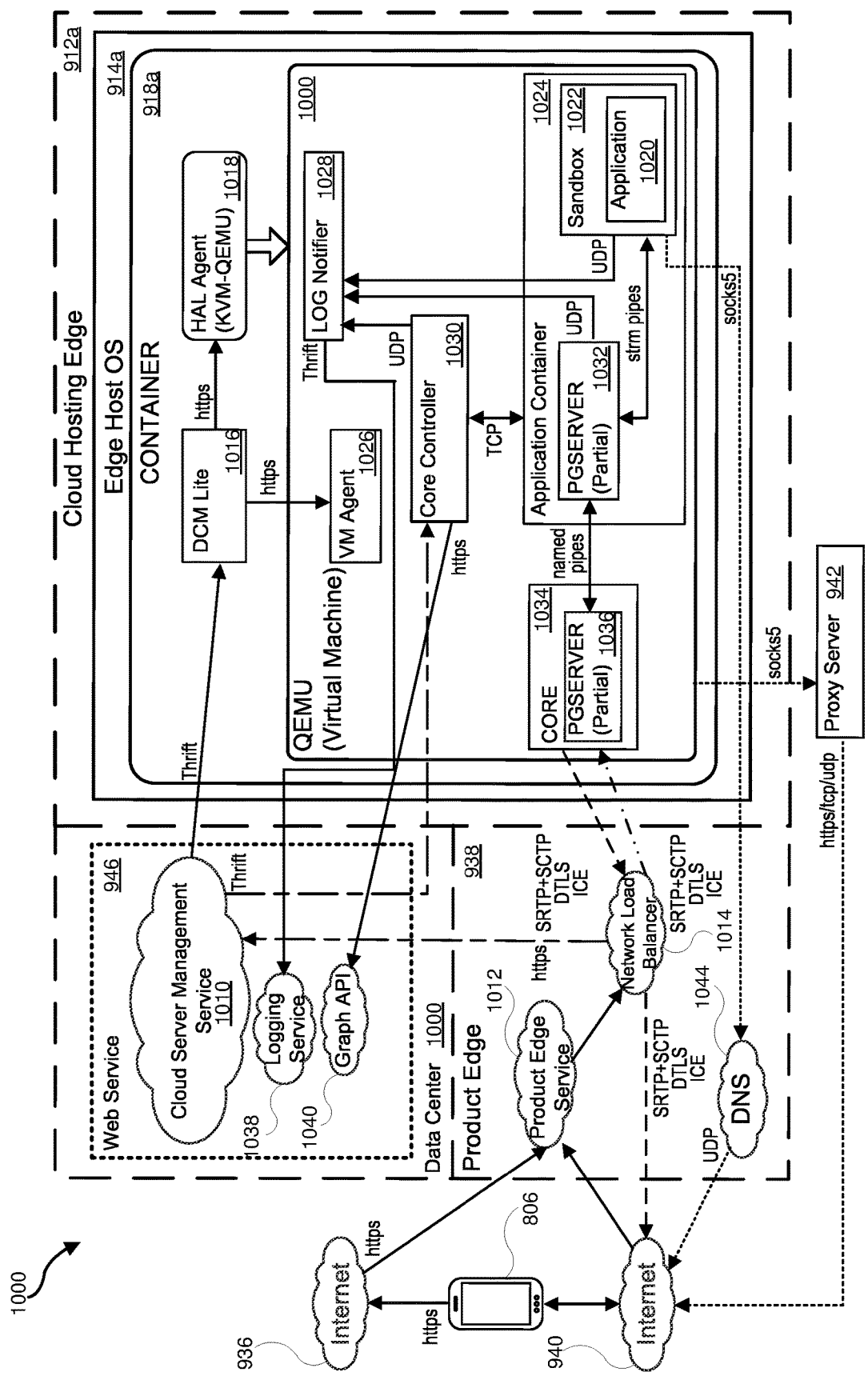
FIG. 10 is an illustration of an example environment for secure concurrent streaming of applications.

The following will provide, with reference to FIGS. 1-4, detailed descriptions of systems for streaming applications; with reference to FIG. 5, an example method for secure concurrent streaming of applications; with reference to FIG. 6, an example system for secure concurrent streaming of applications; with reference to FIG. 7, an example virtualization layer used for secure concurrent streaming of applications; with reference to FIG. 8, an example process for secure concurrent streaming of applications; and with reference to FIGS. 9-10, example environments for secure concurrent streaming of applications. In addition, the following will provide, with reference to FIGS. 11-12, detailed descriptions of artificial-reality systems including augmented-reality glasses and a virtual-reality headset which, in some examples, may be used as remote devices in accordance with the present subject matter.

FIG. 1 is a diagram of an exemplary system 100 for low-latency loading of streaming applications. As illustrated in FIG. 1, the system 100 may include a cloud application platform 102 communicating with a remote device 106 over a network 104. The cloud application platform 102 may include servers and other software and hardware to host, run, and/or execute an application to provide content, such as, but not limited to, graphics and audio content to the remote device 106. In certain examples, the cloud application platform 102 is at least a portion of and/or is embodied as cloud-hosted infrastructure to provide content for delivery to remote devices 106 over the Internet. Furthermore, although a single cloud application platform 102 is depicted, in certain examples, cloud-hosted infrastructure may include multiple instances of the cloud application platform 102.

Regarding the network 104, any suitable network 104 may be used. In certain examples, the network 104 is the Internet, a LAN, a WAN, or the like. Furthermore, any suitable remote device 106 may be used and may include, without limitation, a mobile device such as a smartphone or tablet, a personal computer ("PC"), an artificial-reality system, or the like. The remote device 106 may be a client device to interact with, and/or present content provided by the cloud application platform 102 via a web browser or other application on the remote device 106. Furthermore, the remote device 106 may be in communication with an input device 108 to provide input to the remote device 106. The remote device 106 may, in turn, transmit signals to the cloud application platform 102 to control the application, based in part, on input received from the input device 108. The input device 108 may be any suitable device for providing input and may include, without limitation, a device embodied separately from the remote device 106, such as an external mouse, a keyboard, a game controller, or the like, or a device integrated and/or included with the remote device 106 such as an integrated mouse, a touchscreen, an onboard microphone, or the like.

The cloud application platform 102 may provide an environment with which to execute an application (e.g., a video game) for delivery across the Internet. Specifically, in certain examples, the cloud application platform 102 may provide a server-side hosted environment in which to execute the application. In certain examples, the term "server-side" may refer to a classification of resources that run on a server or other suitable platform to generate and/or deliver content over a network to a remote device 106. In some examples, the cloud application platform 102 may provide various optimizations to allow for enhanced execution of an application such as, for example, applications not designed to operate on the server-side hosted environment, in a cloud-hosted infrastructure, and the like.

In some examples, the cloud application platform 102 may optimize graphics processing of an application executing in the server-side hosted environment, such that an application that is non-native to the server-side hosted environment may execute in such an environment without performance degradation.

In certain examples, and as described in more detail below, the application may be a video game. Furthermore, the video game may be an existing video game designed to execute natively on a local device, on a particular operating system, in a particular environment, or the like. Therefore, the system 100 may host and provide cloud delivery for an existing game, designed for a different platform, to allow for an end-user to play on the end-user's device without performance degradation and without the need for substantial modifications to the game.

Figure 2:
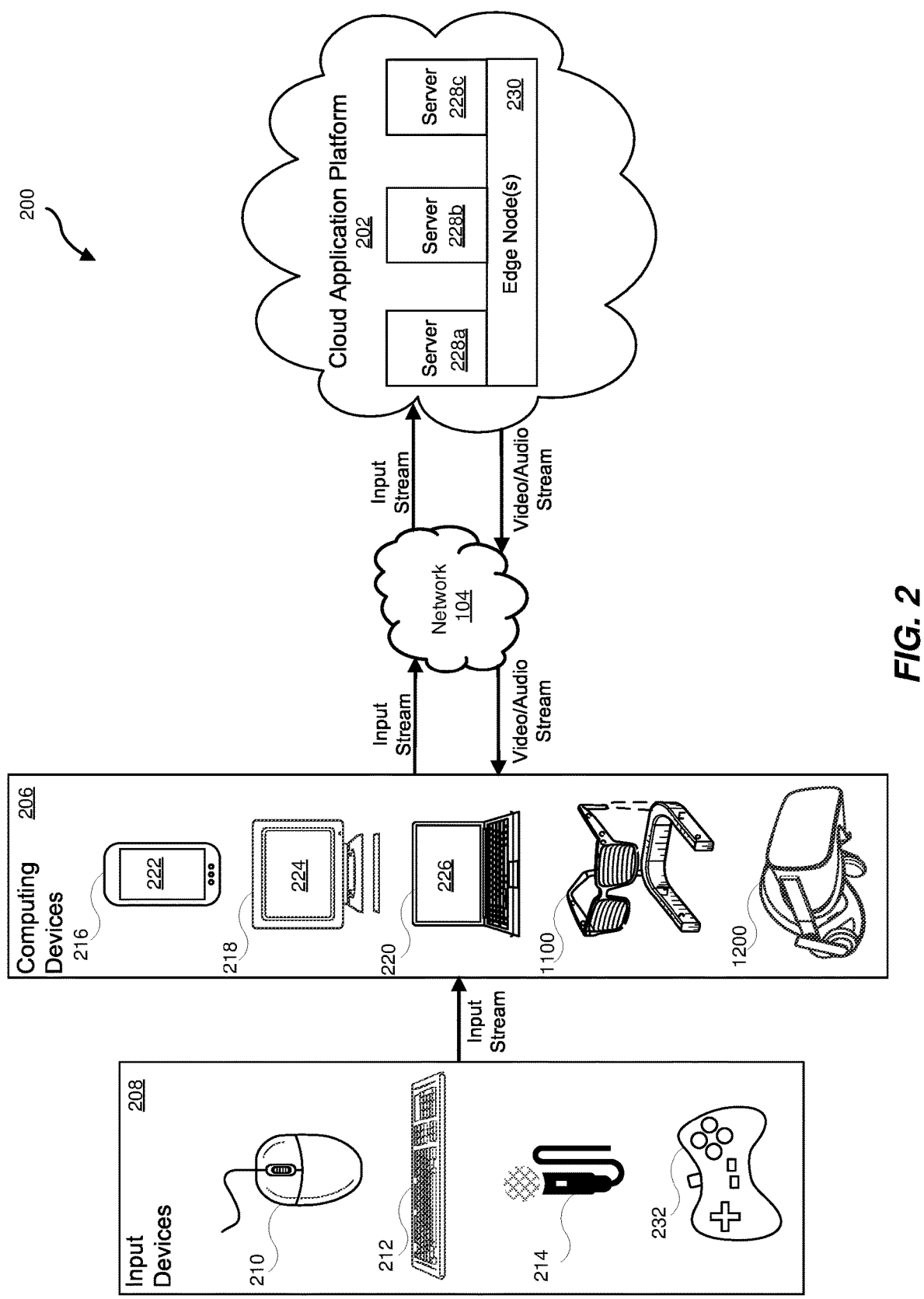
FIG. 2 is a more detailed illustration of various aspects of the system for streaming applications.

FIG. 2 is an illustration that includes details of an exemplary system 200 for hosting an application in a server-side environment. For example, referring to FIG. 1, the system 200 may include input devices 208, which may include the input device 108. The system 200 may include computing devices 206, which may include the remote device 106. The system 200 may include the network 104. The system 200 may include a cloud application platform. In some implementations, the cloud application platform 202 may represent an implementation of the cloud application platform 102. In some implementations, the system 200 may be a cloud gaming system that hosts game applications in a server-side environment.

An input device may include any suitable device for providing input to a computing device. For example, the input devices 208 may include, but are not limited to, a mouse 210, a keyboard 212, a microphone 214, or a game controller 232. The computing devices 206 may be in communication with (connected to) the input devices 208. The computing devices 206 may connected to the input devices by way of a wireless or a wired connection. The computing devices may be in wired or wireless communication with the input devices 208. The input devices 208 may provide an input stream of data to the computing devices 206 by way of a connection between an input device and a computing device.

A computing device may receive input from an input device. In some implementations, a computing device may include the input device. For example, the computing devices 206 may include, but are not limited to, a mobile computing device 216 (e.g., a smartphone, a tablet, a notebook computer, etc.), a personal computing device 218 (e.g., a PC), a laptop computer 220, an augmented-reality system 1100, and a virtual reality ("VR") system 1200. In some implementations, a touchscreen and/or touchpad included in the mobile computing device 216, the personal computing device 218, and/or the laptop computer 220 may be the source of the input that the computing device provides as information and data to the cloud application platform 202 by way of the network 104.

One or more computing devices may communicate with a cloud application platform by way of a network. For example, the computing devices 206 may communicate with the cloud application platform 202 by way of the network 104. The computing devices 206 may send, transmit, or otherwise provide an input stream of data to the cloud application platform 202. The input data stream may include information and data for controlling the execution of a non-native application that is hosted in the server-side hosted environment of the cloud application platform 202. In response, the cloud application platform 202 may send, transmit or otherwise provide a video and/or audio data stream to the computing devices 206. The video and/or audio data stream may be displayed on a display device of the computing device (e.g., display device 222, display device 224, display device 226, a left display device 1115(A) and a right display device 1115(B) (referring to FIG. 11), and/or one or more electronic displays included in the virtual-reality system 1200 which will be described in more detail with reference to FIG. 12).

A cloud application platform may include a plurality of servers. In the example shown in FIG. 2, the cloud application platform 202 includes three servers 228a-c. In some implementations, a cloud application platform may include less than three servers (e.g., two servers, one server). In some implementations, a cloud application platform may include more than three servers.

A cloud application platform may utilize edge computing to efficiently receive an input data stream and to efficiently serve content using an output video and/or audio data stream. The receiving and outputting of data streams may be from cloud servers to computing devices by way of a network. In some implementations, the cloud application platform 202 may utilize edge computing to efficiently receive the input data stream and to efficiently serve the video and/or audio data stream (e.g., content) from cloud servers to the computing devices 206 by way of the network 104. Edge computing may bring computational resources of the cloud application platform 202 closer to a user (a computing device of an end-user) increasing the responsiveness and throughput of the non-native application as it executes in the server-side hosted environment. For example, edge node(s) 230 may include one or more edge nodes. An edge node may provide a connection between a server (e.g., one of the servers 228a-c) and a computing device (e.g., one of the computing devices 206). The edge node may provide service delivery computing offload, internet-of-things (IoT) connection management, storage, and caching. The use of edge computing may create a content delivery network that delivers low latency content from servers (e.g., edge servers) to requesting computing devices.

The system 200 may advantageously allow developers to build applications intended to execute on one computing platform (e.g., operating system) to reach other users operating different computer platforms. and further may provide users with immediate access to applications regardless of device capabilities, such as games, virtual reality (VR) applications for VR systems (e.g., the VR system 1200), augmented reality (AR) applications for AR systems (e.g., the AR system 1100), applications for other types of artificial or augmented reality systems and experiences, and applications that provide streaming media, etc. These advantages may be realized with system 200 by using virtualization technology to run applications in virtual hosting environments on top of a base operating system. Example virtual hosting environments may include, for example, ANDROID virtual environments, MICROSOFT WINDOWS virtual machine ("VM"), and/or other container technologies.

In some implementations, the system 200 may be a cloud gaming system that hosts game applications in a server-side environment. The use of edge computing may allow the system 200 to meet response-time constraints for real-time gaming in a cloud gaming system by providing real-time responses and interactions resulting in adequate performance for a game along with a suitable user experience when the game is run as a cloud-hosted application executing in a cloud-hosted infrastructure environment.

The cloud application platform 102 of FIG. 1 (and/or the cloud application platform 202 of FIG. 2) may have any suitable architecture to allow execution of an application in a server-side hosted environment. FIG. 3 depicts one example of the system 300 with the cloud application platform 102 of FIG. 1 having exemplary architectural details. The cloud application platform 102 may include an operating system 302 in communication with and running on one or more central processing units ("CPUs") 304a-204n. The operating system 302 may also be in communication with one or more graphics processing units ("GPUs") 306a-206n for image and graphics processing. The cloud application platform 102 may have any suitable number of CPUs 304 and GPUs 306.

The operating system 302 may be any suitable operating system. In one example, the operating system 302 supports the basic functioning of the cloud application platform 102 such as hardware and software management, access to resources, task management, and the like. The operating system may include an operating system ("OS") virtualization layer 308 to provide operating system virtualization capabilities allowing the cloud application platform 102 to support multiple, isolated virtual environments. Any suitable OS virtualization layer 308 may be used. In some examples, the OS virtualization layer 308 is a Kernel-based Virtual Machine ("KVM").

The operating system 302 and OS virtualization layer 308 may support one or more virtual containers 310. The cloud application platform 102 may use any suitable virtual container 310. A virtual container 310, in certain examples, is a virtualized software unit providing an isolated environment for software execution and is described in greater detail below.

A virtual container 310 may provide a sandboxed environment to support and execute a server-side hosted environment 312. Likewise, the server-side hosted environment 312 may, in turn, execute an application 314. As will be described in greater detail below, the server-side hosted environment 312 may be any suitable environment for executing the application 314. In certain examples, the server-side hosted environment 312 may be an operating system, an emulator that emulates a specific operating system, an operating system virtual machine, and the like.

Although FIG. 3 depicts a single application 314 executing on a single server-side hosted environment 312, in other examples, multiple applications 314 may execute on a single server-side hosted environment 312. The server-side hosted environment 312, virtual container 310, virtualization layer 308, and/or the operating system 302 may be configured to provide security and isolation among different applications 314 such that one application 314a is isolated from another 314n. Furthermore, as described in greater detail below, in certain examples, the cloud application platform 102 may dynamically create, allocate, and/or provision instances of a virtual container 310 and/or server-side hosted environment 312 as needed. Specifically, when a user initializes an application 314, the cloud application platform 102 may allocate an instance of a virtual container 310 and/or server-side hosted environment 312 to run the application 314 and then deallocate and/or terminate the instance once the user finishes interacting with the application 314. In some examples, the cloud application platform 102 may allocate an instance of the virtual container 310 and/or server-side hosted environment 312 to run the application 314 before the user (or another user) initializes the application 314.

FIG. 4 is an illustration of an exemplary architecture of a system 400 for providing web real-time communication between a computing device and an application platform included a server-side environment. For example, referring to FIG. 2, a computing device 406 may be a computing device included in the computing devices 206. The computing device 406 may communicate and interface with the cloud application platform 202 by way of the network 104. As described with reference to FIG. 2, the computing device 406 may provide an input data stream 410 to the cloud application platform 202. The computing device 406 may receive a video/audio output data stream 412 from the cloud application platform 202 by way of the network 104.

A computing device may include a streaming technology stack. A cloud application platform may include a streaming technology stack. A streaming technology stack may implement the streaming of data between a computing device and a cloud application platform (e.g., a server included in the cloud application platform). For example, referring to FIG.

2, the system 200 may include the system 400. The system 400 may provide web-based (Internet based) real-time, direct, and uninterrupted communication between the computing device 406 and the cloud application platform 202 that applies to both the input data stream 410 and the video/audio output data stream 412.

In some implementations, a streaming technology stack may be implemented using a web real-time communication protocol stack (e.g., a WebRTC protocol stack). The use of a WebRTC protocol stack may enable low latency communications between a sender of streaming data and a receiver of the streaming data. Such low latency communications may enable live streaming between computing systems.

For example, a user may interact with the computing device 406 when interfacing with an application executing in the cloud application platform 202. The user may view, listen to, and/or otherwise interact with content provided by the cloud application platform 202 that may be presented on a display device 422 included in the computing device 406 and/or played on one or more speakers 424 included in the computing device 406. For example, the cloud application platform 202 may provide, send, or transmit the video/audio output data stream 412 using a streaming technology stack 418 that implements a web real-time communication protocol stack 420. The computing device 406 may receive the content from the cloud application platform 202 in a web browser or other application executing locally on the computing device 406. For example, the computing device 406 may include a streaming technology stack 414 that implements a web real-time communication protocol stack 420 that receives the video/audio output data stream 412 from the cloud application platform 202 in real-time. The streaming technology stack 414 may also provide the input data stream 410 from the computing device 406 to the cloud application platform 202 for use or processing by the streaming technology stack 418. Such communications between the computing device 406 and the cloud application platform 202, and specifically between the streaming technology stack 414 and the streaming technology stack 418, may provide direct and uninterrupted communications between the cloud application platform 202 and the computing device 406. The direct and uninterrupted communications may allow for real-time interactions between the computing device 406 and the application running on the cloud application platform 202. Real-time interactions with a cloud-hosted application may be especially critical when the cloud-based application is a game.

A web real-time communication protocol stack may be used to provide data (e.g., digital data, audio data, video data, etc.) between computing systems and computing devices (e.g., the computing device 406 and the cloud application platform 202). The ability to transmit and/or receive such data in real-time may provide support for richer user experiences when interacting with a cloud-hosted application. For example, the user experiences may include, but are not limited to, in-app advertising (IAA), in-app purchases (IAP), and social features such as sharing and requests (e.g., game requests). The system 200, when incorporating the system 400, may allow generic streaming applications to live in the cloud and be accessible to client computing devices of users. The system 200 may provide real-time communications and interactions between a computing device and a cloud application platform without the need for any additional installation or setup for the streaming application.

FIG. 5 is a flow diagram of an exemplary computer-implemented method 500 for secure concurrent streaming of applications. The steps shown in FIG. 5 may be performed by any suitable computer-executable code and/or computing system, including various systems described and/or illustrated herein, such as the systems illustrated in FIGS. 1-4. In one example, each of the steps shown in FIG. 5 may represent an algorithm whose structure includes and/or is represented by multiple sub-steps, examples of which will be provided in greater detail below.

As illustrated in FIG. 5, at step 510 one or more of the systems described herein may provision a cloud gaming environment with a plurality of containers that share a single operating system instance.

In some embodiments, the term "cloud gaming environment" may refer to a cloud-hosted infrastructure environment that is architected to include at least one remote server, an execution environment, and hardware for implementing and running a cloud-hosted system for hosting a video game non-native to the execution environment of the cloud-hosted infrastructure.

In some embodiments, the term "container" may refer to a type or form of partially virtualized environment (e.g., that allows one or more applications within the container at least partial access to the kernel of a system that hosts the container). Thus, for example, a container may not include an entire operating system (or, e.g., any part of an operating system), but may include sufficient computing resources to execute at least one process and/or application when supplemented by computing resources from an operating system of a host computing system and/or other outside resources. In some embodiments, the resources and/or processes within a container may be isolated from resources and/or processes outside the application container and/or the application container may have a default configuration that specifies that communication from the application container to outside resources and/or processes pass through the kernel of the application container's host. In some examples, a container may be distinct from a virtual machine in that a container may not require hardware emulation and/or a complete and separate guest kernel that runs in isolation from a host kernel.

The systems described herein may provision the cloud gaming environment with the plurality of containers in any of a variety of contexts. As will be described in greater detail further below, in some examples these systems may provide the plurality of containers within a virtual machine. Thus, in some examples, the single operating system instance shared by the plurality of containers may be an operating system executing within the virtual machine. Furthermore, in some examples, the virtual machine within which the containers are provisioned may itself execute within a container (which, in some examples, may, in turn, operate within another container). In one example, the containers within which the virtual machine executes may prevent the virtual machine itself from being exploited.

In some embodiments, each container within the plurality of containers may include a corresponding sandbox that intermediates between the video game instance for the container and the operating system instance. In various examples, a corresponding sandbox for a container may intercept one or more application programming interface ("API") calls and/or system calls (both of which may collectively be referred to herein as "system calls" or "API calls") to the operating system to adapt the operation of the video game instance executing within the container to the cloud gaming environment (without, e.g., modifying the underlying video game).

As will be explained in greater detail below, the sandboxes for the various containers may isolate the activity of disparate containers (and, thus, the activity of the corresponding users) from each other despite the shared underlying operating system, improving user privacy and security. In some examples, systems described herein may configure the sandboxes to prevent resource collisions (e.g., occasioned by two or more video game instances attempting to access the same operating system resource) by, e.g., remapping resource access requests made by video game instances to separate resources and/or to resources at the remote client. Additionally, systems described herein may configure the sandboxes may also allow video game instances to operate natively, without modification, in the cloud gaming environment, where the underlying video games may have been designed to execute in a local environment. Furthermore, systems described herein may configure the sandboxes to modify the functionality of one or more of the video game instances without modifying the underlying video game.

In some embodiments, the systems described herein may configure a sandbox of a corresponding container to intercept and modify one or more system calls performed by the video game instance to store persistent data. In these embodiments, these systems may redirect the attempt to store the persistent data to a storage location that is configured for data persistence for the corresponding user across sessions. For example, in the course of streaming a video game, the video game instance may produce save data, configuration data, and/or other data that is designed to be persistent across gaming sessions. However, the containers themselves may not be persistent across gaming sessions. Accordingly, to preserve persistent data for a user (including, e.g., configuration data for a game and/or save data for a video game), systems described herein may intercept system calls for storing the intended persistent data that achieve persistent data storage despite the non-persistence of the container from which the system call was made. In some examples, the sandbox within the container may redirect the attempt to store the intended persistent data to a designated location within the container. Systems described herein may then, before the container is destroyed, copy the intended persistent data from the designated location to a storage location independent of the container, from which systems described herein may retrieve the intended persistent data at a later time (e.g., when the same user initiates another streaming session with the cloud gaming environment (e.g., of the same video game, albeit a new instance in a new container)), and inject the intended persistent data into a new container.

As mentioned above, in some examples the systems described herein may configure the sandbox for a corresponding container to intercept and modify one or more system calls to modify a user-facing behavior of the video game. For example, these systems may configure the sandbox to intercept and modify one or more calls related to system timing in order to change the speed of the video game and/or pause the video game (without, e.g., modifying the underlying video game instance).

In some examples, systems described herein may, for each container within the plurality of containers, provision a corresponding server (e.g., a server application) that intermediates between a corresponding client system of a corresponding user and the container, capturing display and audio data from the container to forward to the corresponding client system and receiving input data from the corresponding client system to forward to the container. In some examples, the server may access display and/or audio data from the container via shared memory with the container. Furthermore, in some examples, the server may be configured to be in communication with the corresponding sandbox of the container (e.g., such that calls by the video game instance for input data, such as from a controller for the video game, are handled by the sandbox and taken from input data provided by the server and received from the client system, rather than from the operating system. In this manner, many users may concurrently stream various video game instances from the cloud gaming environment, each using their own input devices, without causing any resource collisions with the underlying shared operating system (e.g., as many video game instances may wish to access the keyboard, the mouse, a video game controller, etc., but the underlying shared operating system may only have, e.g., one of each device configured).

In some examples, the systems described herein may provision the cloud gaming environment with one or more of the plurality of containers in response to a request by one or more users. For example, a user, from a remote client, may select a video game to play. The remote client may, in response, submit a request to stream the video game from the cloud gaming environment. One or more of the systems described herein may, accordingly, provision the cloud gaming environment with a container within which the video game may execute to be streamed to the user. Thus, the plurality of containers may be provisioned at different times, over time, in response to independent requests from disparate client systems. In some examples, systems described herein may provision the cloud gaming environment with a container that executes a particular video game based on a predicted and/or potential future request by a user to stream the video game.

Returning to FIG. 5, at step 520 one or more of the systems described herein may allocate each container within the plurality of containers to a corresponding user. For example, systems described herein may create a session between a user (e.g., via a remote client in use by the user) and a container allocated to the user. The container may execute a video game being streamed by the user. As will be discussed in greater detail below, because the plurality of containers may be allocated to various different users, the single operating system instance in use by the plurality of containers may thus be used in support of streaming video game instances (e.g., instances of different video games and/or instances of the same video game).

For example, as described above, in some examples systems described herein may provision the cloud gaming environment with a container in response to a request from a user. Accordingly, in these examples, systems described herein may allocate the container to the user based on the request. Allocating the container to the user may include any of a variety of steps. For example, allocating the container to the user may include establishing a session between the container and remote client. In some examples, allocating the container to the user may entail creating permissions for the user to access (e.g., provide input to and/or receive output from) the container to the exclusion of other users.

Furthermore, as discussed above, in some examples systems described herein may provision the cloud gaming environment with a container for executing a video game in anticipation of an as-of-yet-unknown user submitting a request to stream the video game. In these examples, the systems described herein may allocate the container to a user after a user submits a request to stream the video game and is assigned to the available container. In some examples, systems described herein may provision containers for ephemeral users (e.g., temporary user accounts that do not correspond to any actual user) and may allocate a container for an ephemeral user to an actual user in response to a request to stream a video game.

Returning to FIG. 5, at step 530 one or more of the systems described herein may execute, concurrently, within each container within the plurality of containers a corresponding video game instance. As discussed above, in some examples the video game instances executing within the containers may include instances of the same video game and/or instances of different video games.

Because the video game instances execute concurrently within the plurality of containers, the video game instances may make concurrent use of the operating system shared by the plurality of containers. As discussed earlier, in some examples, a host system (e.g., hosting a virtual machine that includes the plurality of containers) may include one or more physical GPUs. In some examples, systems described herein may pass calls for a GPU by one or more video game instances executing within the plurality of containers to a physical GPU on the host system. By passing calls through to the physical GPU (rather than, e.g., to a virtual and/or emulated GPU), systems described herein may improve performance for the video game instances while maximizing GPU usage efficiency. Furthermore, these systems may configure the corresponding sandboxes for the containers to intercept and modify calls to the GPU. These systems may modify calls to the GPU to isolate data from different users from each other despite the shared GPU and/or to prevent ambiguity and/or resource collisions that may otherwise be caused by two video game instances (e.g., including two instances of the same video game) making use of the same resource.

In some examples, systems described herein may configure sandboxes of the respective containers to intercept calls to network resources. For example, the sandboxes may remap uses of a network port by a videogame instance to a unique port number for use external to the corresponding containers. Thus, two video game instances running in separate containers that each attempt to use the same network port may nevertheless concurrently operate correctly with different network ports outside of their respective containers.

The systems described herein may also intercept and modify system calls by video game instances within their respective sandboxes for any resource that may be unique, named, and/or otherwise be subject to a collision with a system call by another video game instance. For example, a system call regarding the window currently in focus for the operating system may be intercepted and modified such that each container maintains a separate understanding of what window is in focus, rather than having the underlying operating system identify the window in focus.

In some examples, system calls relating to localization may be intercepted and modified by the sandboxes (e.g., to match the localization for the users of the corresponding containers). This may allow the system to support multiple different concurrent localizations even when the underlying shared operating system only supports a single localization at a time. Thus, for example, a sandbox may make a user appear to be from a particular country, in a particular timezone, etc. In one example, the sandboxes may intercept and modify low-level calls to sockets to go through a proxy (e.g., a SOCKS proxy).

Returning to FIG. 5, at step 540 one or more of the systems described herein may stream, concurrently, from the cloud gaming environment, a video game instance from each container within the plurality of containers to a corresponding client system.

In some embodiments, the term "stream" may refer to a process whereby an application, such as a video game, executes on a server while input is received from a remote client and output (e.g., graphics, sound, etc.) is presented to the remote client in real-time.

Because, as described above, systems described herein may isolate user data and may prevent conflicts between disparate video game instances attempting to access the same operating system resources, multiple users may concurrently stream multiple video game instances (whether the same video game or different video games) from the cloud gaming environment efficiently, privately, securely, and without error or interruption that may otherwise be caused by conflicts.

FIG. 6 illustrates an example system 600 for secure concurrent streaming of video games. As shown in FIG. 6, system 600 may include a client 602 in communication with a server 604. Server 604 communications with a unique user and container 606. System 600 also includes a core controller 608 and an operating system API 610. A game 616 executes within container 606, produces a game session 612, and streams to client 602 by way of server 604. Game 616 makes calls to operating system API 610. These calls may be intercepted and modified by a sandbox 614 within container 606. Sandbox 614 may modify these calls to isolate the user of client 602 from other users despite multiple containers, each for a different user, sharing the same underlying operating system. Sandbox 614 may also modify calls so that persistent data generated by game 616 is written to a cloud profile 618. Data in cloud profile 618 may be preserved even when container 606 is destroyed. The preserved data from cloud profile 618 may later be injected into a new container (e.g., provisioned for the same user and, in some examples, a different instance of the same video game).

Example system 600 may provide an illustration of how systems described herein may provision the cloud gaming environment with a new game instance for streaming to client 602. For example, client 602 may request a game session. A data center manager ("DCM") 603 may reserve a gaming node inside a virtual machine 610. Core controller 608 may prepare virtual machine 610 for executing game 616. For example, core controller 608 may perform one or more of the following steps: (1) mounting the game disk, (2) downloading a user profile (e.g., into cloud profile 618), (3) downloading game settings, (4) configuring a firewall, (5) mounting a registry hive, (6) creating a unique user (e.g., an ephemeral user) for the game session, (7) assign permissions to system resource, (8) run a game installer, and create server 604. DCM 603 may confirm the assignment of the gaming node to client 602.

In one example, to launch game 616, systems described herein may perform one or more of the following steps: (1) client 602 may connect to server 604 (e.g., via a web real-time communication protocol stack), (2) core controller 808 may send a request to server 604 to launch game 616, (3) server 604 may create container 606 and game session 612, (4) server 604 may create pipes for remote procedure calls with sandbox 614, (5) server 604 may create a launcher process inside container 606, (6) the launcher process may create the game process, (7) the launcher process may inject sandbox 614 inside the game process, (8) sandbox 614 may install hooks on OS API functions, and (9) game 616 may start playing.

FIG. 7 illustrates an example virtualization layer used for compatible concurrent streaming of applications. An application 702 makes calls to an operating system ("OS") 720. A sandbox 704 is interposed between application 702 and operating system 720 and intercepts and modifies some calls between application 702 and operating system 720. For example, operating system 720 may provide an OS library 706, an OS library 708, a library 712, and a library 716. Systems described herein may hook library 712, resulting in a hooked library 710. Likewise, systems described herein may hook library 716, resulting in a hooked library 714. Sandbox 704, hooked library 710, and hooked library 714 may constitute a virtualization layer 730. Calls made by application 702 to a function of library 712 or library 716 may instead be directed by sandbox 704 to be handled by hooked library 710 and hooked library 714, respectively.

By intercepting calls to the operating system API, systems described herein may virtualize OS resources, capture audio and/or video output from the application (e.g., video game), inject input into the video game from a source beyond the operating system (e.g., a remote client), isolate the video game from the rest of the system, handle errors and/or crashes of the video game, and/or add new features to the video game.

In some examples, hooks may be grouped into modules (e.g., by functionality). Systems described herein may load some modules for each sandbox. Other modules may be optionally loaded (e.g., depending on the video game instance and whether the functionality is called for the particular video game instance). Examples of modules that may always be loaded may include audio modules (relating to capturing audio output from the game instance), file modules (involving redirecting file system calls to a user profile that will be made persistent beyond the life of the container), registry modules (involving redirecting attempts to write to the OS registry to the user profile), input modules (relating to injecting input, such as controller input, into the container for use by the game instance), display modules (e.g., relating to virtualizing the screen size, the desktop, etc.), OS modules (e.g., relating to intercepting OS messages), CPU modules, localization modules, graphics device interface modules, etc. Examples of modules that may be optionally loaded may include video modules (e.g., relating to capturing video output), gamepad modules (e.g., relating to injecting gamepad input), socket modules (e.g., relating to blacklisting and/or whitelisting network connections), etc.

Systems described herein may use any suitable technique for intercepting system calls including, without limitation, dynamic link library ("DLL") injection and function hooking.

FIG. 8 is an illustration of an example process for compatible concurrent streaming of applications. As shown in FIG. 8, a game 802 may make calls to an API 806. A sandbox 804 may intercept and modify some calls by game 802. Sandbox 804 may also communicate with a server 808. For example, an original call 810 by game 802 may result in a communication 812 involving game 802 and API 806. In contrast, a sandboxed call 820 may result in a communication involving game 802 and sandbox 804. Sandbox 804 may modify the call and perform an additional communication 824 involving sandbox 804 and API 806. In addition, sandbox 804 may perform a communication 826 from the call to server 808. In one example, the calls in FIG. 8 may illustrate calls by game 802 to API 806 to render audio samples. Thus, a sandboxed call 820 to render audio samples may result in sandbox 804 intercepting the call, performing a version of the call to API 806, transferring the audio samples to server 808, and returning the results of the call to game 802.

FIG. 9 is an illustration of an example environment for secure concurrent streaming of applications. As shown in FIG. 9, a system 900 may host an application in a server-side environment. For example, the system 900 may include a data center 910. In some implementations, a cloud application platform may be included in a data center. For example, referring to FIG. 2, the cloud application platform 202 may be included in the data center 910. Multiple data centers (e.g., more than one data center) may host one or more applications in a server-side environment in the cloud.

A data center may include one or more spaces or areas in the data center where one or more servers and other equipment may directly connect to an Internet network backbone. Such a space or area may be referred to as a colocation center or a COLO. In some examples, the data center 910 may include one or more cloud hosting edges (e.g., cloud hosting edges 912a-b). Each cloud hosting edge 912a-b may include server(s) and/or equipment that virtualize and/or emulate an operating system environment for executing non-native applications in the cloud. For example, the server 350 may be an example of a server included in a cloud hosting edge. In one non-limiting example, the cloud hosting edge 912a may be a cloud hosting edge that includes servers and equipment for supporting non-native applications intended to run in a first operating system (e.g., a MICROSOFT WINDOWS operating system). The cloud hosting edge 912b may be a cloud hosting edge that includes servers and equipment for supporting non-native applications intended to run in a second operating system (e.g., an ANDROID operating system). Though the data center 910 shown in FIG. 9 includes two cloud hosting edges, in some implementations, a data center may include one cloud hosting edge, and in some implementations, a data center may include multiple cloud hosting edges (e.g., two cloud hosting edges, more than two cloud hosting edges). In some implementations, the data center 910 may include at least one cloud hosting edge for supporting a virtualization of an operating system. In some implementations, the data center 910 may include at least one cloud hosting edge for supporting emulation of an operating system.

In some implementations, a data center 910 may include one or more edge servers. In these cases, the servers included in the data center may perform computing, networking, storage, security, and other computer-based functions and interactions by way of edge nodes. For example, referring to FIG. 2, the cloud application platform 202 may utilize edge computing to efficiently receive an input data stream and to efficiently serve content using an output video and/or audio data stream. Each of the servers 228a-c may be an cloud edge OS as shown in the example of FIG. 9. Referring to FIG. 3, the server 350 may represent an cloud edge OS as shown in FIG. 9.

Each COLO may include at least one edge operating system (OS) host. For example, an cloud edge OS may be an edge server in a COLO in a data center. For example, referring to FIG. 3, the server 350 may be an cloud edge OS. For example, the cloud hosting edge 912a may include cloud edge OSs 914a-b. The cloud hosting edge 912b may include cloud edge OSs 916a-b. Though each of the COLOS 912a-b shown in FIG. 9 include two cloud edge OSs, in some implementations, a COLO may include one cloud edge OS, and in some implementations, a COLO may include multiple cloud edge OSs (e.g., two cloud edge OSs, more than two cloud edge OSs). In some implementations, each COLO may include the same number of cloud edge OSs. In some implementations, each COLO may include a different number of cloud edge OSs.

An cloud edge OS may include one or more containers for virtualizing an operating system. Each container may execute a non-native application intended to run in an operating system in a virtualized environment provided by the container. Each container may include hardware and/or software for virtualizing an execution environment for a non-native application intended to run in the execution environment. For example, the cloud edge OS 914*a* may include containers 918*a-b*. The cloud edge OS 914*b* may include containers 922*a-b*. Each container 918*a-b* may include a hardware virtualization module 920*a-b*, respectively. Each container 922*a-b* may include a hardware virtualization module 924*a-b*, respectively. Each hardware virtualization module 920*a-b* and 924*a-b* may include hardware and/or software for virtualizing an execution environment (e.g., a MICROSOFT WINDOWS operating system environment) for a non-native application intended to run in the execution environment (e.g., for a non-native application intended to run in a MICROSOFT WINDOWS operating system environment).

An cloud edge OS may include one or more containers for emulating an operating system. Each container may execute a non-native application intended to run in an operating system in an emulated environment provided by the container. Each container may include hardware and/or software for emulating an execution environment for a non-native application intended to run in the execution environment. For example, the cloud edge OS 916*a* may include containers 926*a-b*. The cloud edge OS 916*b* may include containers 930*a-b*. Each container 926*a-b* may include an emulator module 928*a-b*, respectively. Each container 930*a-b* may include an emulation module 932*a-b*, respectively. Each emulation module 928*a-b* and 932*a-b* may include hardware and/or software for emulating an execution environment (e.g., an ANDROID operating system environment) for a non-native application intended to run in the execution environment (e.g., for a non-native application intended to run in an ANDROID operating system environment).

Though each of the cloud edge OSs 914*a-b* and 916*a-b* shown in FIG. 9 include two containers, in some implementations, an cloud edge OS may include one container, and in some implementations, an cloud edge OS may include multiple containers (e.g., two containers, more than two containers). In some implementations, each cloud edge OS may include the same number of containers. In some implementations, each cloud edge OS may include a different number of containers.

A computing device may run a browser application locally on the computing device. A user may interact with the browser application by way of an internet connection to an origin server to access the world wide web. The origin server may process a request to execute the non-native application in the cloud application platform. In some implementations, the origin server may interface with one or more edge nodes in an edge computing environment. Through the browser application a user may interact with a non-native application executing in a cloud application platform that hosts the non-native application. In some implementations, a product edge may provide an interface point between communicating entities such as a computing device and one or more servers. The product edge may include one or more of computers, routers, switches, multiplexers, and/or other types of network interface equipment, hardware, and/or software for implementing and managing the communication interface point.

A computing device may run a social media application locally on the computing device. In some implementations, the user may run the social media application by using the browser. A user may interact with the social media application by way of an internet connection to an origin server to access the world wide web. In some implementations, the social media application may provide real-time game play (e.g., real-time access and interactions with a gaming application) to a user (an end user) of the computing device. In some implementations, the browser application may provide real-time game play (e.g., real-time access and interactions with a gaming application) to a user (an end user) of the computing device.

A computing device may execute a browser application. Referring to FIGS. 4 and 9, the computing device 406 may execute a browser application 934. A user may interact with the browser application 934. A user interacting with the browser application 934 may input a web page address for a web page that may serve the content for the page. The web page address may be for a cloud application platform that may execute non-native applications. The web page address may be provided to an internet connection 936 using Hypertext Transfer Protocol (HTTP) or Hypertext Transfer Protocol Secure (HTTPS) for data communication via the Internet. For example, the browser application 934 may provide game play to the user of the computing device by allowing the user to access and interact with a gaming application (e.g., a video game) that may be executed in the cloud application platform.

A computing device may execute a social media application. Referring to FIGS. 4 and 9, the computing device 406 may execute a social media application 948. A user may interact with the social media application 948. The social media application 948 may provide game play to the user of the computing device by allowing the user to access and interact with a gaming application (e.g., a video game) that may be executed in the cloud application platform.

A web service may receive requests to access web pages on the world wide web. For example, web service 944 in the data center 910 may receive a web page address for a cloud gaming application on the Internet that provides access to the non-native application executing in a cloud application platform by way of the browser application 934. In some examples, web service 944 may include and/or communicate with a cloud server management service 946.

A product edge may provide an interface point between communicating entities. For example, a product edge 938 may provide a communication interface point for the computing device 406 and each cloud edge OS included in cloud hosting edge 912*a* and cloud hosting edge 912*b*. For example, the product edge 938 may direct or route input received from the computing device 406 to the web service 944. Referring to FIG. 4, the product edge 938 may receive the data from the computing device 406 using the input data stream 410 by way of the internet connection 936 as provided by the network 104. The product edge 938 may direct or route input received from the computing device 906 to a container executing a non-native application. The product edge 938 may direct or route output data (e.g., the video/audio output data stream 412 as shown in FIG. 4) from a container executing a non-native application to the computing device 406 using an internet connection 940 provided by the network 104. For example, the internet connection 940 may provide a communication channel for sending and receiving real-time streaming video and/or audio data between the computing device 406 and a container on an cloud edge OS using a streaming technology stack that implements a web real-time communication protocol stack. In some implementations, each COLO may include a product edge. The product edge 938 may include one or more of servers, routers, switches, multiplexers, and/or other types of network interface equipment, hardware, and/or software for implementing and managing the communication interface point. In some implementations, the network 104 may provide the internet connection 936 and the internet connection 940.

A proxy server may provide information and data to the internet connection 940 through a firewall. For example, a proxy server 942 may be a forward proxy that may provide requests, information, and/or data from the cloud hosting edge 912a and/or the cloud hosting edge 912b to the computing device 406 by way of the internet connection 940 through a firewall.

FIG. 10 is an illustration of an example environment for secure concurrent streaming of applications. FIG. 10 is an illustration of an exemplary architecture of a system 1000 for hosting an application intended to execute in a first operating system in a server-side environment. The first operating system may be a desktop operating system. For example, the first operating system may be a MICROSOFT WINDOWS operating system. The system 1000 may host an application intended to execute in a MICROSOFT WINDOWS operating system. The system 1000 may host the application in a server-side hosted environment as shown in, for example, FIG. 9. The server-side hosted environment may be non-native to the application. The server-side hosted environment may include a virtual machine (e.g., hardware virtualization 920a) for virtualizing the environment in the server intended to run the application.

A user interacting with a browser application on a computing device may enter a web page address for a cloud application platform. Referring to FIG. 9, a user of the computing device 406 may enter a web page address to access a cloud application platform executing the non-native application that the user wants to interact with. The product edge 938 may direct the web page address received by way of the internet connection 936 using a product edge service 1012 and network load balancer 1014 to a cloud server management service 1010 of the web service 946. In some implementations, the cloud server management service 1010 may include a cloud gaming load balancer. The cloud server management service 1010 may manage access to a container that is implementing a virtualization of the execution environment for the non-native application in the cloud application platform.

An origin server may access a container that may execute a non-native application on an edge host. For example, the web service 944 may communicate with the container 918a that may execute the non-native application in a virtualization of the first operating system. The cloud server management service 1010 may communicate with a data control module (e.g., DCM Lite module 1016) included in the container 918a. The DCM Lite module 1016 may interface with a configuration and deployment management platform module (e.g., HAL agent 1018) that may provide a kernel-based virtual machine (KVM) providing access to a Quick EMUlator (QEMU) hosted virtual machine monitor that performs the hardware virtualization 920a in the container 918a. The DCM Lite module 1016 may also communicate with a virtual machine (VM) agent 1026. In some implementations, a software suite (e.g., systemd) may be used by an operating system running native to the cloud edge OS 914a to spawn the hardware virtualization 920a. The hardware virtualization 920a may virtualize or emulate the hardware and operating system for execution of the non-native application (e.g., application 1020) in a sandboxed environment (e.g., sandbox 1022) included in an application container 1024 in the hardware virtualization 920a.

The hardware virtualization 920a may include a LOG notifier 1028, a core controller 1030, a PGSERVER (Partial) 1032, and a core 1034 that includes a PGSERVER (Partial) 1036. The LOG notifier 1028 may record information and data regarding details about the application 1020 executing in the hardware virtualization 920a that may be provided to a logging service 1038 included in the web service 944. The logging service 1038 may store and provide the information and data for possible access by a user. The core controller 1030 may control the operation of the hardware virtualization 920a. The core controller 1030 may communicate or interface with the cloud server management service 1010 and a Graph application programming interface (API) 1040. The Graph API 1040 may provide a representation of information on a social media platform. Referring to FIG. 9, the Graph API 1040 may upload information and data related to the execution of the non-native application in the cloud application platform to the browser application 934 running on the computing device 406.

The PGSERVER (Partial) 1032 and the PGSERVER (Partial) 1036 may provide a video/audio output data stream to the product edge 938 by way of the core 1034. An output of the sandbox 1022 may connect to or interface with a domain name system (DNS) 1044 included in the product edge 938 for providing output from the application 1020 running in the sandbox 1022 to the computing device 406 by way of the internet connection 940.

In a streaming application hosting platform like cloud gaming, efficient use of system resources (e.g., few resources going unused) and user security and privacy may all be important. Mechanisms described herein may virtualize each game instance's runtime environment to share system resources and isolate each game session from each other. The sandbox may lower each game's effective system permissions and present each game with a constrained view of system resources. This system may work even when games do not natively support such sandboxing or running multiple instances in parallel. To support a larger game library, automated monitoring tools may automatically configure the sandbox and identify compatibility issues. The system may include tooling to detect potential compatibility and security issues, a component to configure the operating system to create a low-privilege environment, and a runtime component that intercepts specific system calls and virtualizes them to enable running within the containerized environment.

EXAMPLE EMBODIMENTS

Example 1: A computer-implemented method may include provisioning a cloud gaming environment with a plurality of containers that share a single operating system instance; allocating each container within the plurality of containers to a corresponding user; executing, concurrently, within each container within the plurality of containers a corresponding video game instance; and streaming, concurrently, from the cloud gaming environment, a video game instance from each container within the plurality of containers to a corresponding client system.

Example 2: The computer-implemented method of Example 1, where each container within the plurality of containers comprises a corresponding sandbox that intermediates between the video game instance for the container and the operating system instance.

Example 3: The computer-implemented method of any of Examples 1 and 2, where, for each container within the plurality of containers, the corresponding sandbox is configured to intercept and modify one or more system calls performed by the video game instance for the container.

Example 4: The computer-implemented method of any of Examples 1-3, where intercepting and modifying one or more system calls includes intercepting an attempt to store persistent data; and redirecting the attempt to store the persistent data to a storage location that is configured for data persistence for the corresponding user across sessions.

Example 5: The computer-implemented method of any of Examples 1-4, where intercepting and modifying one or more system calls includes intercepting and modifying a call to a physical graphics processing unit; and passing the modified call to the physical graphics processing unit.

Example 6: The computer-implemented method of any of Examples 1-5, where intercepting and modifying one or more system calls includes intercepting a system call to access a system resource that is unique for the operating system instance; and modifying the system call to access the system resource that is unique for the operating system instance to access a different resource.

Example 7: The computer-implemented method of any of Examples 1-6, where intercepting and modifying one or more system calls comprises modifying a user-facing behavior of the video game instance.

Example 8: The computer-implemented method of any of Examples 1-7, where each container within the plurality of containers isolates corresponding users from each other, such that no user data within one container is accessible by another container.

Example 9: The computer-implemented method of any of Examples 1-8, where the plurality of containers are deployed within a single virtual machine.

Example 10: The computer-implemented method of any of Examples 1-9, where, for each container within the plurality of containers, a corresponding server intermediates between a corresponding client system of a corresponding user and the container, capturing display and audio data from the container to forward to the corresponding client system and receiving input data from the corresponding client system to forward to the container.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
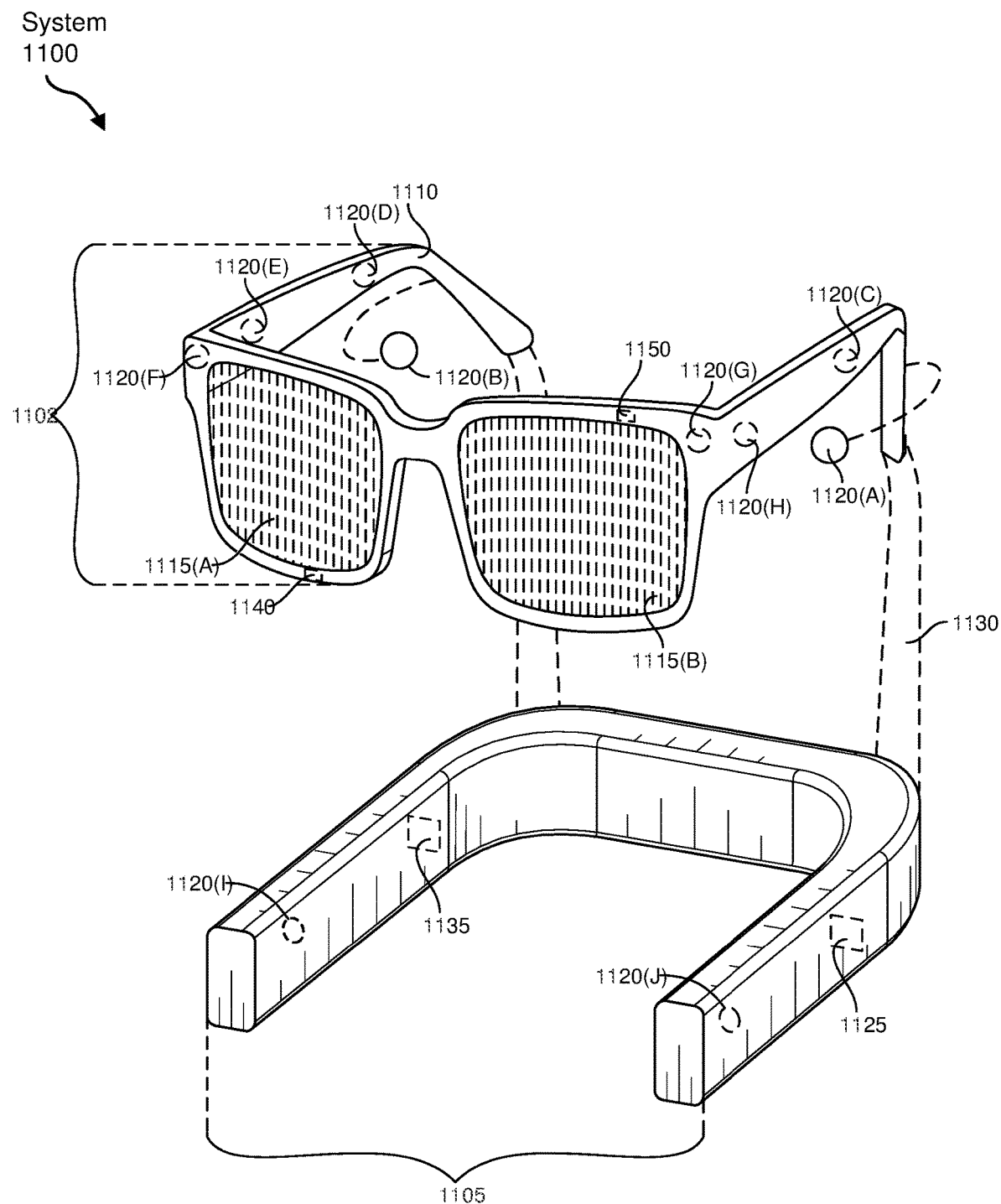
FIG. 11 is an illustration of exemplary augmented-reality glasses that may be used in connection with embodiments of this disclosure.
Figure 12:
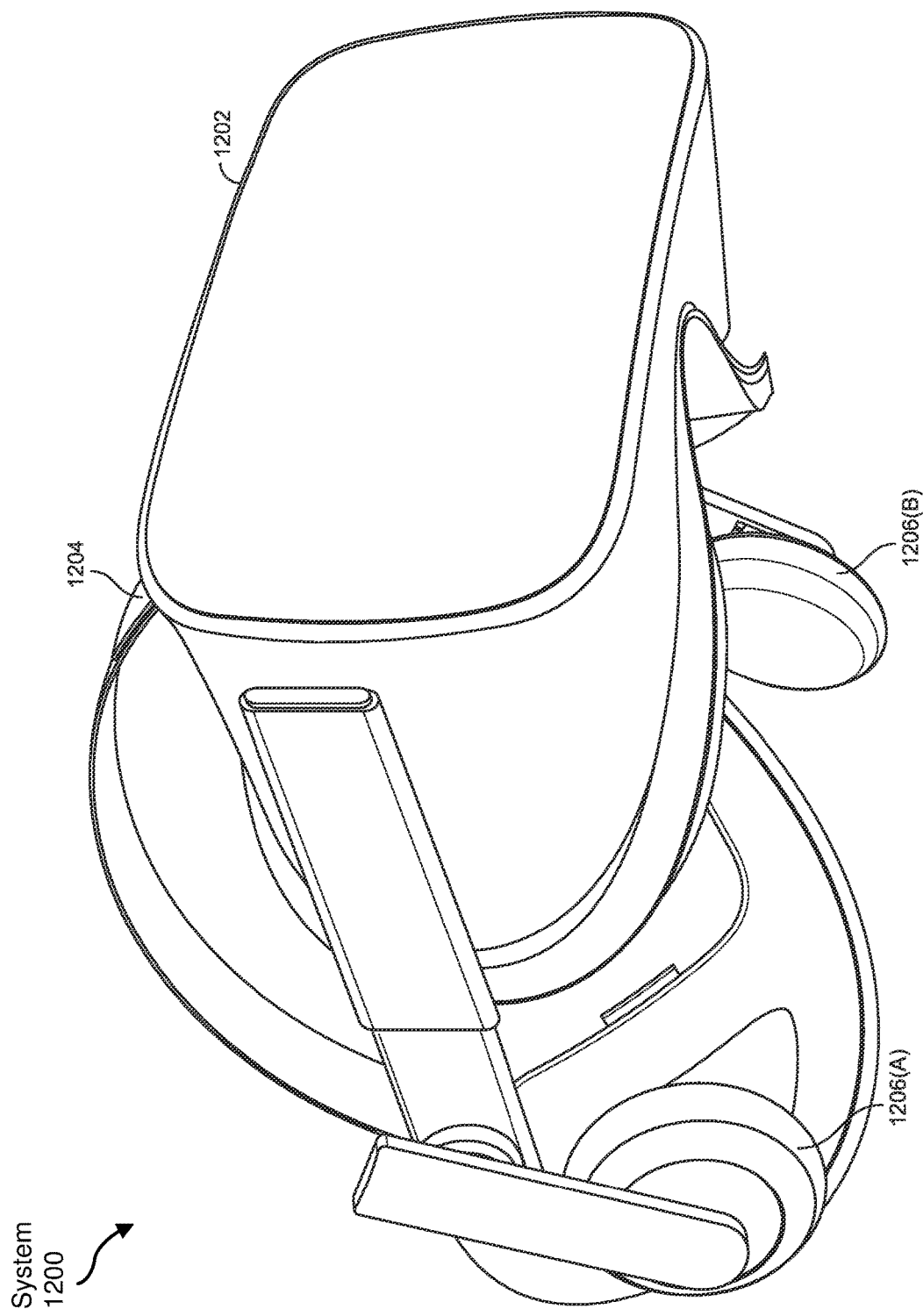
FIG. 12 is an illustration of an exemplary virtual-reality headset that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(J) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a BLUETOOTH connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive API calls to be transformed, transform the API calls, output a result of the transformation to securely stream a video game, use the result of the transformation to securely stream a video game, and store the result of the transformation to preserve user data across gaming sessions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
provisioning a cloud gaming environment with a plurality of containers that share a single operating system instance;
allocating each container within the plurality of containers to a corresponding user;
executing, concurrently, within each container within the plurality of containers a corresponding video game instance; and
streaming, concurrently, from the cloud gaming environment, a video game instance from each container within the plurality of containers to a corresponding client system.

2. The computer-implemented method of claim 1, wherein each container within the plurality of containers comprises a corresponding sandbox that intermediates between the video game instance for the container and the operating system instance.

3. The computer-implemented method of claim 2, wherein, for each container within the plurality of containers, the corresponding sandbox is configured to intercept and modify one or more system calls performed by the video game instance for the container.

4. The computer-implemented method of claim 3, wherein intercepting and modifying one or more system calls comprises:
   intercepting an attempt to store persistent data; and
   redirecting the attempt to store the persistent data to a storage location that is configured for data persistence for the corresponding user across sessions.

5. The computer-implemented method of claim 3, wherein intercepting and modifying one or more system calls comprises:
   intercepting and modifying a call to a physical graphics processing unit; and
   passing the modified call to the physical graphics processing unit.

6. The computer-implemented method of claim 3, wherein intercepting and modifying one or more system calls comprises:
   intercepting a system call to access a system resource that is unique for the operating system instance; and
   modifying the system call to access the system resource that is unique for the operating system instance to access a different resource.

7. The computer-implemented method of claim 3, wherein intercepting and modifying one or more system calls comprises modifying a user-facing behavior of the video game instance.

8. The computer-implemented method of claim 1, wherein each container within the plurality of containers isolates corresponding users from each other, such that no user data within one container is accessible by another container.

9. The computer-implemented method of claim 1, wherein the plurality of containers are deployed within a single virtual machine.

10. The computer-implemented method of claim 1, wherein, for each container within the plurality of containers, a corresponding server intermediates between a corresponding client system of a corresponding user and the container, capturing display and audio data from the container to forward to the corresponding client system and receiving input data from the corresponding client system to forward to the container.

11. A system comprising:
   at least one physical processor;
   physical memory comprising computer-executable instructions that, when executed by the physical processor, cause the physical processor to:
      provision a cloud gaming environment with a plurality of containers that share a single operating system instance;
      allocate each container within the plurality of containers to a corresponding user;
      execute, concurrently, within each container within the plurality of containers a corresponding video game instance; and
      stream, concurrently, from the cloud gaming environment, a video game instance from each container within the plurality of containers to a corresponding client system.

12. The system of claim 11, wherein each container within the plurality of containers comprises a corresponding sandbox that intermediates between the video game instance for the container and the operating system instance.

13. The system of claim 12, wherein, for each container within the plurality of containers, the corresponding sandbox is configured to intercept and modify one or more system calls performed by the video game instance for the container.

14. The system of claim 13, wherein intercepting and modifying one or more system calls comprises:
   intercepting an attempt to store persistent data; and
   redirecting the attempt to store the persistent data to a storage location that is configured for data persistence for the corresponding user across sessions.

15. The system of claim 13, wherein intercepting and modifying one or more system calls comprises:
   intercepting and modifying a call to a physical graphics processing unit; and
   passing the modified call to the physical graphics processing unit.

16. The system of claim 13, wherein intercepting and modifying one or more system calls comprises:
   intercepting a system call to access a system resource that is unique for the operating system instance; and
   modifying the system call to access the system resource that is unique for the operating system instance to access a different resource.

17. The system of claim 13, wherein intercepting and modifying one or more system calls comprises modifying a user-facing behavior of the video game instance.

18. The system of claim 11, wherein each container within the plurality of containers isolates corresponding users from each other, such that no user data within one container is accessible by another container.

19. The system of claim 11, wherein the plurality of containers are deployed within a single virtual machine.

20. A non-transitory computer-readable medium comprising one or more computer-executable instructions that, when executed by at least one processor of a computing device, cause the computing device to:
   provision a cloud gaming environment with a plurality of containers that share a single operating system instance;
   allocate each container within the plurality of containers to a corresponding user;
   execute, concurrently, within each container within the plurality of containers a corresponding video game instance; and
   stream, concurrently, from the cloud gaming environment, a video game instance from each container within the plurality of containers to a corresponding client system.

* * * * *